United States Patent Office.

EDWARD GOODE, OF BARTOW, FLORIDA, ASSIGNOR OF ONE-HALF TO THOMAS A. GOODE, OF SAME PLACE.

ARTIFICIAL STONE.

SPECIFICATION forming part of Letters Patent No. 518,239, dated April 17, 1894.

Application filed August 30, 1893. Serial No. 484,390. (No specimens.)

*To all whom it may concern:*

Be it known that I, EDWARD GOODE, a citizen of the United States, residing at Bartow, in the county of Polk and State of Florida, have invented certain new and useful Improvements in Artificial Stone for Monuments, &c.; and I do hereby declare the following to be a full, clear, and exact description of the invention, such as will enable others skilled in the art to which it appertains to make and use the same.

My invention consists of an artificial stone especially adapted for use in the making of monuments,—and in the process of making the same. For the main portion, or body of the stone I employ clean white sand, or marble dust, entirely freed from soil or other foreign substance, and pure Portland cement, the proportions of these ingredients being from one to two parts of sand to one part of the cement. These ingredients I thoroughly mix in a dry condition, and then add thereto sufficient water to make a stiff mortar, which when of the desired and of a uniform consistency, is placed in the mold which gives the desired shape to the article being made. When the mold is full, and the surface is properly dressed to give the desired smoothness of surface, it is allowed to stand for a few minutes so that the water will gather upon the surface. I then sift pure cement upon the surface, which may be smoothed if desired after the cement has been placed thereon, and then allow it to stand until the water again collects, after which cement is again evenly and uniformly sprinkled upon the surface, and this operation is repeated several times. The mold containing the above described composition is now left for a suitable length of time, usually for about twenty-four hours, to harden. When sufficiently hard, but while yet moist, I saturate the surface with a strong solution of lime-water, care being taken to remove, by a soft rag or sponge, any surplus lime which may collect upon the surface. This saturation is repeated as often as may be necessary during two or three days and until the surface portion of the artificial stone becomes thoroughly saturated with the lime-water.

It will be observed that I do not use lime in the composition of the body-portion of the artificial stone, as I have found that this is objectionable for the reason that when lime is used the body of the stone is caused to crack by reason of the shrinkage of the lime in the process of drying, whereas when the body of the stone is made only of sand and pure cement, as described, this cracking is avoided, and a more uniform, solid and durable stone is the result. It will also be noticed that upon the body-portion of the stone is formed a skin or surface portion of pure cement. This I find to be very advantageous in that it makes a surface of great hardness, and to which can be imparted a smoothness of finish which cannot be obtained with the composition which makes up the body of the stone. A stone having the surface thus prepared is especially adapted to receive clean or clearly cut impressions from letters or other designs which may be laid thereon, and therefore is especially useful in the making of monuments upon which it is desired to place inscriptions.

In order to make the impressions in the surface, I use dies or type shaped to form letters, figures or other desired designs, and place them upon the surface of the stone, and cause them to be embedded therein to the desired extent by slight pressure.

I find that by treating the surface of the artificial stone, produced as above described, and while it is still moist, with lime-water, a marble-like effect is produced which adds much to the appearance of the stone. The whiteness which is imparted to the stone by the lime contained in the lime-water is of a lasting quality and is not affected by exposure to the weather.

In the making of monuments or other articles from the composition which I have described, I ordinarily prefer to fill the molds about half full with the composition of sand and cement, and then place in the molds iron rods, which being embedded in the article, give strength thereto without impairing its appearance.

Any suitable tools may be employed for the finishing of the surface of the stone, both before the surface coating is applied thereto, and after such surface coating has been placed thereon.

It will be understood that a desirable artificial stone is produced without the treating of the surface with the lime-water, although I prefer this step as it improves the appearance of the finished article.

Having thus described my invention, what I claim, and desire to secure by Letters Patent, is—

1. An artificial stone having a body portion of sand and hydraulic cement, and a skin of pure cement impregnated with lime, whereby the skin portion of the stone has a permanent, white, marble-like appearance, substantially as set forth.

2. The herein described process of making artificial stone, which consists in mixing together pure sand and Portland cement with sufficient water to make a thick mortar, then molding this composition, then forming a surface by sifting or placing thereon dry hydraulic cement, and then finishing the said surface, substantially as set forth.

3. The herein described process of making artificial stone, which consists in forming a body of a mixture of sand, hydraulic cement and water, then applying thereto a surface or skin of pure hydraulic cement, allowing the stone thus formed to harden, and then treating the surface with lime-water, while the stone is yet moist, substantially as set forth.

In testimony whereof I affix my signature in presence of two witnesses.

EDWARD GOODE.

Witnesses:
FRANCIS A. WOLFF,
S. M. TATUM.